United States Patent Office 3,108,098
Patented Oct. 22, 1963

3,108,098
NOVEL N-MORPHOLINESULFONYL UREAS
James M. McManus, Uncasville, Conn., assignor to Chas. Pfizer & Co., Inc., New York, N.Y., a corporation of Delaware
No Drawing. Filed Sept. 7, 1962, Ser. No. 222,771
6 Claims. (Cl. 260—247.1)

This invention relates to new and useful sulfamylureas which are effective in lowering the amount of sugar in the blood. More particularly, it is concerned with various novel N-morpholinesulfonylureas and with the base salts thereof, as well as with the method of reducing the blood sugars in a diabetic subject by the oral administration thereto of said sulfamylureas or of one of their pharmaceutically acceptable salts.

The novel compounds which are included within the scope of the present invention are all selected from the group consisting of sulfamylureas of the formula:

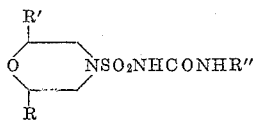

wherein each of R and R′ are members selected from the group consisting of hydrogen and lower alkyl, and R″ is a member selected from the group consisting of bicyclo[2.2.1]hept-5-en-2-ylmethyl and bicyclo[2.2.1]hept-2-ylmethyl; and the alkali metal, alkaline-earth metal, ammonium and water-soluble amine addition salts of said sulfamylureas.

Among the typical member compounds of this series are such novel N-morpholinesulfonylureas as 1-(N-morpholinesulfonyl)-3-(bicyclo[2.2.1]hept-5-en - 2 - ylmethyl) urea, 1-[N-(2,6-dimethylmorpholinesulfonyl]-3-(bicyclo[2.2.1]hept-5-en-2-ylmethyl)urea, 1-[N-(2-methylmorpholinesulfonyl)]-3-(bicyclo[2.2.1]hept-5-en-2-ylmethyl)urea, 1-[N-(2-methylmorpholinesulfonyl)]-3 - (bicyclo[2.2.1]hept-2-ylmethyl)urea, 1 - [N-(2,6-di-n-propylmorpholinesulfonyl)]-3-(bicyclo[2.2.1]hept-2-ylmethyl)urea, 1-[N-(2-ethylmorpholinesulfonyl)] - 3 - (bicyclo[2.2.1]hept - 5 - en - 2-ylmethyl)urea, and the like.

The new N-morpholinesulfonylurea compounds of this invention are especially valuable and useful as agents for lowering blood sugar levels when administered orally to an animal subject, including man. The advantages offered by the pharmacologically acceptable compounds of this invention are manifold: for instance, (1) they may be administered orally as aforesaid, thereby eliminating parenteral administration which is often very painful and irritating; (2) they lower blood sugar levels for a sustained period of time; (3) toxic side effects have been found to be either minimal or else completely absent; (4) pharmacological investigation reveals no evidence of kidney damage or crystalluria; (5) they are easily prepared in good yield from readily available starting materials and lastly, (6) these compounds readily lend themselves to the preparation of suitable oral dosage formulations.

The herein described new compounds can be readily synthesized by the reaction of a N-morpholinesulfonylisocyanate with the appropriate bicyclicamine or conversely, by the reaction of a N-morpholinesulfonamide with the appropriate isocyanate or with compounds which can be converted into such an isocyanate during the course of the reaction; or by the reaction of a N-morpholinesulfonylurethane with the appropriate amine or conversely, the reaction of a N-morpholinesulfonamide with an appropriate urethane; or by the reaction of a N-morpholinesulfonamide with the appropriate N-monosubstituted carbamyl chloride; or by the conversion of a N-morpholinesulfonylurea to the desired 3-substituted compound by means of the appropriate amine; or by the reaction of a N-morpholinesulfonamide with the appropriate 1,3-(disubstituted)urea; or the reaction of a N-morpholinesulfonyl chloride with the corresponding isourea in the form of a suitable salt, followed by acid hydrolysis of the resulting intermediate; or by the reaction of a N-morpholinesulfonylchloride with the appropriate 1,3-(disubstituted)thiourea or the corresponding substituted guanidine by either first desulfurizing or hydrolyzing these reagents or by employing them as such, followed by respective desulfurization or hydrolysis to the desired N-morpholinesulfonylurea compound.

Preferred synthetic routes in this connection include the reaction of the N-morpholinesulfonamide with the appropriate isocyanate in accordance with a modification of the procedure of F. Kurzer [Journal of the Chemical Society (London), 1951, p. 1258], employing a strongly basic organic amine such as triethyl amine as a catalyst. Another preferred method of synthesis, which is even more desirable from the standpoint of yields, involves the reaction of an alkali metal or alkaline-earth metal salt of the N-morpholinesulfonamide with either a 1,1,3-trisubstituted urea such as $(R''')_2NCONHR''$ or with an aryl N-monosubstituted carbamate or a corresponding thiolcarbamate such as $R'''XCONHR''$, where X is either oxygen or sulfur and R′″ is an aryl group such as phenyl, p-chlorophenyl, p-bromophenyl, p-nitrophenyl, p-acetylaminophenyl, p-tolyl, p-anisyl, α-naphthyl, β-naphthyl, and the like.

The preferred methods of synthesis are illustrated below by the following two equations wherein M represents the cation of an alkali metal salt, Z is the morpholine moiety as previously described and X is either oxygen or sulfur as aforesaid:

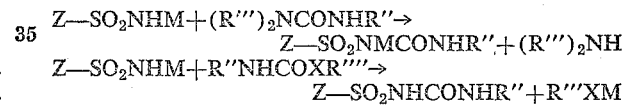

This reaction is preferably carried out in the presence of a reaction-inert polar organic solvent medium. Typical organic solvents useful in this connection include the N,N-di(lower alkyl) substituted derivatives of lower aliphatic hydrocarbon carboxamides such as dimethylformamide, dimethylacetamide, diethylformamide, diethylacetamide, as well as lower dialkyl sulfoxides and sulfones such as dimethyl sulfoxide, diethyl sulfoxide, diisopropyl sulfoxide, di-n-propyl sulfoxide, dimethyl sulfone, diethyl sulfone, diisopropyl sulfoxide, dimethyl sulfone, diethyl sulfone, diisopropyl sulfone and di-n-propyl sulfone. It is desirable that the aforementioned solvent be present in sufficient amount to dissolve each of the starting materials. In general, the reaction is conducted at a temperature that is in the range of from about 20° C. up to about 150° C. for a period of about one-half to about ten hours. Recovery of the desired product from the reaction mixture is then most conveniently accomplished by first diluting the reaction solution with water and then adjusting the resulting aqueous solution to at least pH 8.0, followed by subsequent extraction of the basic aqueous solution with any water-immiscible organic solvent in order to remove minor amounts of unreacted or excess starting material that might possibly be present at this stage. Isolation of the desired N-morpholinesulfonylurea from the basic aqueous layer is then effected by the addition thereto of a dilute aqueous acid solution, wherein the acid is present in sufficient amount to cause precipitation of said sulfamylurea to occur from the solution.

In connection with a more detailed consideration of this preferred method of synthesis, the relative amounts of the agents employed is such that the molar ratio of the N-morpholinesulfonamide salt to either the 1,1-diaryl-3-(monosubstituted)urea or aryl N-monosubstituted carbamate or thiolcarbamate is desirably in the preferred range of from about 1:1 to about 1:3, although substantially equimolar ratios will afford satisfactory results in this reaction. Nevertheless, an excess of the trisubstituted urea or aryl N-monosubstituted carbamate or thiolcarbamate is usually employed inasmuch as this not only aids in shifting the reaction equilibrium to the product side of the equation, but it is also advantageous in that the excess reagent is easily removed after completion of the reaction by means of the solvent extraction step previously referred to. Moreover, it is to be noted that the formation of the phenolic or aryl mercaptan by-products is greatly enhanced by the over-all basic character of the reaction mixture.

The N-morpholinesulfonamide starting materials necessary for the process of this invention are compounds which are either commercially available and/or are well-known in the prior art or else they are easily prepared in accordance with standard organic procedures previously described in the chemical literature.

The other major starting materials required for this reaction, viz., the 1,1-diaryl-3-(monosubstituted)ureas and the aryl N-monosubstituted carbamates or thiolcarbamates, are all readily prepared from common organic reagents by employing standard procedures well-known in the art. For instance, the desired trisubstituted urea may be prepared in accordance with the general procedure described by Reudel in the Recueil des Travaux Chimiques des Pays-Bas, vol. 33, p. 64 (1914), which is illustrated below by the following equation wherein R''' is the aryl group previously defined:

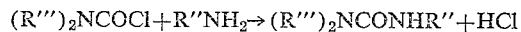

In the case of the aryl N-monosubstituted carbamate or thiolcarbamate type compounds, application of the well-known Schotten-Baumann technique starting with

and R'''XH is extremely suitable.

Insofar as the N-morpholinesulfonylureas of this invention are acidic compounds, they are capable of forming a wide variety of salts with various bases. In practice, it is preferable to employ a strong base for such a purpose in view of the nature of the compound which is to be reacted. Although such salts must be pharmaceutically acceptable as the final products are solely intended for oral human consumption, it is possible to first isolate the desired sulfamylurea from the reaction mixture in the form of a pharmaceutically unacceptable salt and then to subsequently convert the latter salt to the free acid sulfonylurea compound by treatment with a dilute mineral acid such as 6 N HCl; the free N-morpholinesulfonylureas so obtained are then converted to a pharmaceutically acceptable base salt thereof in the manner as hereinafter indicated.

For instance, the base salts of the sulfamylureas of this invention may be prepared by treating the acidic compound with a substantially equimolar amount of the chosen base. The salt-formation step can be carried out in aqueous solution or in a suitable organic solvent such as methanol or ethanol. Upon careful evaporation of the solvent, the solid salt is obtained. Alternatively, other recovery techniques are also applicable, such as freeze-drying when the solvent is water or the use of an antisolvent in the case of an organic solution, e.g., the addition of diethyl ether to a methanolic solution of the product will cause precipitation of the salt from said solution to occur.

The bases which are used to prepare the pharmaceutically acceptable base salts of the N-morpholinesulfonylureas of this invention are those which form non-toxic salts containing pharmaceutically acceptable cations, such as the alkali metal, alkaline-earth metal, ammonium or water-soluble amine addition salts, like the lower alkanolammonium and other base salts with organic amines which are compatible with the human system. Preferred members of this group include the sodium, potassium, magnesium, calcium and ethanolammonium salts. Some of these salts such as the sodium, magnesium and ethanolammonium salts are especially valuable in view of their water-solubility.

As previously mentioned, the N-morpholinesulfonylurea compounds of this invention are all readily adapted to therapeutic use as oral antidiabetic agents. Furthermore, the toxicity of all these compounds has been found to be quite low when they are orally administered to mice in amounts which are sufficient to achieve the desired therapeutic effects. Moreover, no other harmful pharmacological side effects, such as crystalluria or kidney damage, have been observed to occur as a result of their administration. The hypoglycemic activity of these particular sulfamylureas is well illustrated by the series of tests hereinafter described, wherein intact male albino rats each weighing approximately 150 grams are the experimental test animals used. The test animals are fasted for approximately 20–24 hours prior to oral administration of the drug, and food is also withheld from them throughout the entire test period. Blood sugar levels are then determined as glucose on tail blood samples at two and four hour intervals in accordance with the micro method of Folin-Malmros, and groups of control and treated rats are sacrificed after each determination. The treated animals are given the sulfamylurea to be tested at the 100 mg./kg. dosage level; in each instance, the drug is suspended in a 1% carboxymethyl-cellulose solution and the doses are administered in a volume of 4 ml./kg. In each and every case, the control rats are given the same vehicle alone, and the results obtained are expressed in terms of the percent decrease in the fasting blood glucose value from the control pre-treatment value.

In this connection, it is significant to note that the results obtained shows that the compounds of the present invention exhibit a hypoglycemic effect which is comparable to that afforded by the known clinically useful oral anti-diabetic agents in this field. For instance, the percent decrease in fasting blood glucose values in the rat when orally administered 1-(N-morpholinesulfonyl)-3-(bicyclo[2.2.1]hept-5-en-2-ylmethyl)urea and 1-[N-(2-methylmorpholinesulfonyl)] - 3-(bicyclo[2.2.1]hept-5-en-2-ylmethyl)urea at the 100 mg./kg. dosage level is respectively as follows (the values after the minus sign in parenthesis) at the end of two, four and six hour time periods:

| Compound | Pretreatment Level (mg. percent) | Post-treatment | | |
|---|---|---|---|---|
| | | 2 hrs. | 4 hrs. | 6 hrs. |
| 1-(N-morpholinesulfonyl)-3-(bicyclo[2.2.1]hept-5-en-2-ylmethyl)urea | 69 | 41(−40) | 48(−30) | 56(−19) |
| 1-[N-(2-methylmorpholinesulfonyl)]-3-(bicyclo[2.2.1]hept-5-en-2-ylmethyl)urea | 70 | 38(−46) | 44(−37) | 58(−17) |

Data illustrating the results of acute toxicity tests performed in conjunction with the clinical testing program indicate that the herein described N-morpholinesulfonylureas can all be considered to be relatively non-toxic in nature. Microscopic examination of urine samples collected at five and twenty-five hours after oral administration to such animals reveals the absence of any crystalluria or kidney damage as aforementioned.

In accordance with a method of treatment of the present invention, the hypoglycemically-effective N-morpholinesulfonylureas or one of their aforementioned pharmaceutically acceptable salts can be administered to the diabetically-afflicted subject via the oral route as previously indicated. In general, these compounds are most satisfactorily administered at a dosage level that is in the range of from about 75 mg. to about 2.25 g. per day in the order of about one to about five doses, although variations will necessarily occur depending upon the weight of the subject being treated. However, a dosage level that is in the range of from about 1.0 mg. to about 30 mg. per kg. of body weight per day is most desirably employed in order to achieve effective results. Nevertheless, it is to be appreciated that still other variations may also occur in this respect, depending upon the severity of the patient's condition and on its individual response to said hypoglycemic agent, as well as on the particular oral formulation and/or compound chosen and the time period and interval at which such administration is carried out. In some instances, dosage below the lower limit of the aforesaid range may be more than adequate, while in other cases still larger dosages may be employed without causing any harmful or deleterious side effects to ensue, provided that such higher dose levels are first divided into several smaller doses that are to be administered throughout the day.

The herein described N-morpholinesulfonylureas or one of their aforementioned pharmaceutically acceptable salts may be administered either alone or, and preferably, in combination with a pharmaceutically acceptable carrier. Such administration can be carried out in either single or multiple doses. The compounds of this invention may be administered in suitable unit dosage forms which will preferably contain at least 1.0 mg. per dosage unit, although concentration levels in the range of from about 1.0 mg. to about 30 mg. per unit dosage per day may be employed to advantage. When larger doses of these hypoglycemic agents are to be employed, it is preferable to administer two or more unit doses at various time intervals, adjusting, if necessary, the content of the antidiabetic agent per unit dosage form accordingly. Moreover, multiple dose treatment has indicated the feasibility, in some instances, of administering the sulfamylurea-containing compositions at periodic time intervals, e.g., by orally administering the hypoglycemic agent to an afflicted subject at a dosage level that is in the range of approximately 0.250–1.0 g. per day divided into about two to about five doses of equal strength that are to be administered throughout the day. Furthermore, optimum results can often be obtained in such cases by administering a higher dose initially, followed by the administration of a maintence dose of therapy at a lower dosage thereafter, e.g., 1.0 g. the first day, 0.6 g. the second day, 0.4 g. the third day, and 0.2 g. per day thereafter.

It is apparent from the foregoing that the hypoglycemically-active compounds of this invention can be administered in a wide variety of different oral dosage forms, i.e., they may be combined with various pharmaceutically acceptable inert carriers in the form of capsules, tablets, lozenges, troches, hard candies, aqueous suspensions, elixirs, etc. Such carriers include solid diluents or fillers, aqueous media, various non-toxic organic solvents, and the like. Moreover, these oral pharmaceutical compositions can be sweetened and/or flavored by means of various agents of the type commonly employed for just such a purpose. In general, the sulfamylureas of this invention are present in such oral dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as alginic acid and certain complex silicates, together with binding agents such as polyvinylpyrrolidone, gelatin and acacia; in addition, lubricating agents, such as magnesium stearate, sodium lauryl sulfate and talc are often very useful for tabletting purposes. Solid compositions of a similar type may also be employed as fillers in soft elastic and hard-filled gelatin capsules; preferred materials in this connection would also include polyethylene glycol, propylene glycol and glycerin as they may not only be used in this particular type of pharmaceutical dosage form as diluents, but also as plasticizing agents as well serving to protect the capsule against any leakage that might possibly occur due to the denaturation of the gelatin protein contained in the capsule wall. When aqueous suspensions and/or elixirs are desired for oral administration, the active ingredients of this invention may be combined with various sweetening and flavoring agents, coloring matter or dyes and, if so desired, emulsifying and/or suspending agents, together with such diluents as water, ethanol, propylene glycol and glycerin as well as various like combinations thereof.

This invention is further illustrated by the following examples, which are not to be construed in any way as imposing any limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

A suspension consisting of 1.7 g. (0.009 mole) of the monosodium salt of N-morpholinesulfonamide and 3.18 g. (0.010 mole) of 1,1-diphenyl-3-(bicyclo[2.2.1]hept-5-en-2-ylmethyl)urea in 25 ml. of N,N-dimethylformamide was heated on a steam bath for 16 hours while under a nitrogen atmosphere. The resulting solution was then cooled to room temperature (25° C.) and added to 125 ml. of water, whereupon a white-oily solid soon separated. The latter substance was subsequently removed by means of filtration and the filtrate extracted with three-successive 125 ml. portions of diethyl ether. The aqueous layers were saved in each case, filtered and then made acidic with 6 N hydrochloric acid. The crystalline material which formed almost immediately was collected on a filter funnel, dried and recrystallized from diethyl ether to afford 2.1 g. of 1-(N-morpholinesulfonyl)-3-(bicyclo[2.2.1]hept-5-en-2-ylmethyl)urea, M.P. 122.5–123.5° C.

Analysis.—Calcd. for $C_{13}H_{20}N_3O_4S$: C, 49.66; H, 6.41; N, 13.37. Found: C, 49.48; H, 6.48; N, 13.40.

Example II

The procedure described in Example I is repeated using 0.009 mole of the monosodium salt of N-(2-methylmorpholine)sulfonamide in place of the corresponding starting material used in Example I. In this particular case, the corresponding product obtained was 1-[N-(2-methylmorpholinesulfonyl)] - 3 - (bicyclo[2.2.1]hept-5-en-2-ylmethyl)urea, M.P. 115–116° C.

Analysis.—Calcd. for $C_{14}H_{23}N_3O_4S$: C, 51.04; H, 7.04; N, 12.76. Found: C, 51.20; H, 6.95; N, 12.74.

Example III

The procedure described in Example I is repeated using 0.009 mole of the monosodium salt of N-(2,6-dimethylmorpholine)sulfonamide in place of the corresponding starting material used in Example I. In this particular case, the corresponding product obtained was 1-[N-(2,6-dimethylmorpholinesulfonyl)] - 3 - (bicyclo[2.2.1]hept-5-en-2-ylmethyl)urea, M.P. 139–140° C.

Analysis.—Calcd. for $C_{15}H_{25}N_3O_4S$: C, 52.46; H, 7.34; N, 12.24. Found: C, 52.57; H, 7.28; N, 11.78.

Example IV

The procedure described in Example I is repeated using other starting materials and reagents in place of those specifically mentioned therein. For the sake of time and convenience and in order to avoid any unnecessary repetition of experimental detail, the general procedure employed is outlined below as follows:

To 0.009 mole of the monosodium salt of the N-morpholinesulfonamide suspended in 25 ml. of anhydrous dimethylformamide there is added 0.010 mole of the appropriate N,N-diphenylurea derivative. The reaction mixture is then heated on a steam bath overnight for approximately 16 hours, cooled to room temperature and diluted with 125 ml. of water. After extraction of the resulting solution with diethyl ether and subsequent acidification of the aqueous layer, there is obtained the desired N-morpholinesulfonylurea in the form of a crystalline precipitate.

The sulfamylurea products obtained in this manner are listed below in the following table:

1-(N-morpholinesulfoynl)-3-(bicyclo[2.2.1]hept-2-ylmethyl)urea
1-[N-(2-methylmorpholinesulfonyl)]-3-(bicyclo[2.2.1]hept-2-ylmethyl)urea
1-[N-(2-ethylmorpholinesulfonyl)]-3-(bicyclo[2.2.1]hept-5-en-2-ylmethyl)urea
1-[N-(2-ethylmorpholinesulfonyl)]-3-(bicyclo[2.2.1]hept-2-ylmethyl)urea
1-[N-(2-isopropylmorpholinesulfonyl)]-3-(bicyclo[2.2.1]hept-5-en-2-ylmethyl)urea
1-[N-(2-isopropylmorpholinesulfonyl)]-3-(bicyclo[2.2.1]hept-2-ylmethyl)urea
1-[N-(2-n-propylmorpholinesulfonyl)]-3-(bicyclo[2.2.1]hept-5-en-2-ylmethyl)urea
1-[N-(2,6-dimethylmorpholinesulfonyl)]-3-(bicyclo[2.2.1]hept-2-ylmethyl)urea
1-[N-(2,6-diethylmorpholinesulfonyl)]-3-(bicyclo[2.2.1]hept-5-en-2-ylmethyl)urea
1-[N-(2,6-diethylmorpholinesulfonyl)]-3-(bicyclo[2.2.1]hept-2-ylmethyl)urea
1-[N-(2,6-diisopropylmorpholinesulfonyl)]-3-(bicyclo[2.2.1]hept-5-en-2-ylmethyl)urea
1-[N-(2,6-diisopropylmorpholinesulfonyl)]-3-(bicyclo[2.2.1]hept-2-ylmethyl)urea
1-[N-(2,6-di-n-propylmorpholinesulfonyl)]-3-(bicyclo[2.2.1]hept-5-en-2-ylmethyl)urea
1-[N-(2,6-di-n-propylmorpholinesulfonyl)]-3-(bicyclo[2.2.1]hept-2-ylmethyl)urea
1-[N-(2-methyl-6-ethylmorpholinesulfonyl)]-3-(bicyclo[2.2.1]hept-5-en-2-ylmethyl)urea
1-[N-(2-methyl-6-ethylmorpholinesulfonyl)]-3-(bicyclo[2.2.1]hept-2-ylmethyl)urea
1-[N-(2-methyl-6-isopropylmorpholinesulfonyl)]-3-(bicyclo[2.2.1]hept-5-en-2-ylmethyl)urea
1-[N-(2-methyl-6-isopropylmorpholinesulfonyl)]-3-(bicyclo[2.2.1]hept-2-ylmethyl)urea
1-[N-(2-n-propylmorpholinesulfonyl)]-3-(bicyclo[2.2.1]hept-2-ylmethyl)urea
1-[N-(2-methyl-6-n-propylmorpholinesulfonyl)]-3-(bicyclo[2.2.1]hept-5-en-2-ylmethyl)urea
1-[N-(2-methyl-6-n-propylmorpholinesulfonyl)]-3-(bicyclo[2.2.1]hept-2-ylmethyl)urea
1-[N-(2-ethyl-6-isopropylmorpholinesulfonyl)]-3-(bicyclo[2.2.1]hept-5-en-2-ylmethyl)urea
1-[N-(2-ethyl-6-isopropylmorpholinesulfonyl)]-3-(bicyclo[2.2.1]hept-2-ylmethyl)urea
1-[N-(2-ethyl-6-n-propylmorpholinesulfonyl)]-3-(bicyclo[2.2.1]hept-5-en-2-ylmethyl)urea
1-[N-(2-ethyl-6-n-propylmorpholinesulfonyl)]-3-(bicyclo[2.2.1]hept-2-ylmethyl)urea

*Example V*

A mixture consisting of 61.5 g. (0.50 mole) of 2-aminomethylbicyclo[2.2.1]-5-heptene, 116 g. (0.50 mole) of N,N-diphenylcarbamyl chloride and 70 g. (0.7 mole) of triethylamine in 250 ml. of absolute ethanol was heated on a steam bath for 16 hours. At the end of this time, the ethanolic solution which resulted was concentrated to one-half of its original volume in vacuo and cooled. The crystalline solids which had precipitated during the cooling period were then filtered and suspended in water, and the resulting aqueous suspension was filtered to give 54 g. of the product after drying and recrystallization from diethyl ether. In this manner, there was obtained pure 1,1-diphenyl-3-(bicyclo[2.2.1]hept-5-en-2-ylmethyl)urea, M.P. 124–125° C.

*Analysis.*—Calcd. for $C_{21}H_{22}N_2O$: C, 79.21; H, 6.97; N, 8.80. Found: C, 79.16; H, 7.00; N, 8.92.

*Example VI*

The procedure described in Example V is followed except 0.50 mole of 2-aminomethylbicyclo[2.2.1]heptane is the starting material employed in place of the corresponding 5-unsaturated compound. In this particular case, the corresponding product obtained is 1,1-diphenyl-3-(bicyclo[2.2.1]hept-2-ylmethyl)urea.

*Example VII*

A N-morpholinesulfonylurea is dissolved in an equimolar amount of a 15% aqueous sodium hydroxide solution at a temperature of approximately 40° C. The resulting solution is then adjusted to a pH of 7.5 by the addition of small amounts of either the sulfamylurea or 15% aqueous sodium hydroxide solution as the case may be. The so-adjusted solution is then filtered and allowed to stand for some time in an ice-box until crystallization of the desired salt occurs, e.g., the sodium salt of 1-(N-morpholinesulfonyl) - 3 - (bicyclo[2.2.1]hept - 5 - en - 2-ylmethyl)urea if the latter compound is the particular sulfamylurea employed as starting material in this example.

In like manner, the use of lithium hydroxide in place of the sodium hydroxide used above affords the corresponding lithium salts.

*Example VIII*

The procedure described in Example VII is initially followed except that the concentration of the aqueous sodium hydroxide employed is such that it is sufficient to afford a 20% solution of the sulfamylurea compound. This solution is then heated to 80° C. and filtered, and the resulting filtrate treated with twice the equimolar amount of a 15% aqueous potassium carbonate solution at this same temperature. After cooling the resultant reaction mixture to room temperature, crystallization of the so prepared potassium salt of the particular sulfamylurea employed as starting material soon occurs.

*Example IX*

A N-morpholinesulfonylurea prepared as described in Examples I–IV is dissolved in an equimolar amount of triethanolamine and sufficient water to afford a 50% solution of said sulfamylurea. This solution is then heated to approximately 60° C., filtered while hot and the resulting filtrate poured into an aqueous calcium chloride solution containing 100 g. of calcium chloride dissolved in 100 ml. of water and whose temperature is also at 50° C. On cooling to room temperature and further standing for several hours, the calcium salt of the particular sulfamylurea employed as starting material crystallizes from solution. In this way, the calcium salt of 1 - [N - (2,6 - dimethylmorpholinesulfonyl) - 3 - (bicyclo[2.2.1]hept-5-en-2-ylmethyl)urea is obtained when the latter sulfamylurea is the particular compound employed as starting material.

In like manner, the strontium and barium salts of each of the N-morpholinesulfonylureas of this invention are also each individually obtained in accordance with this very same reaction procedure by merely substituting the appropriate alkaline-earth metal chloride, i.e., either strontium chloride or barium chloride as the case may be in place of the calcium chloride used above.

*Example X*

A N-morpholinesulfonylurea prepared as described in Examples I–IV is dissolved in 2 ml. of 10 N ammonium hydroxide at 50° C. The resulting solution is filtered immediately, and then allowed to cool to room temperature and to further stand at this point for several hours until crystallization occurs. In this manner, white crystals of the ammonium salt of 1-[N-(2-methylmorpholinesulfonyl)]-3-(bicyclo[2.2.1]hept-2-ylmethyl)urea are obtained from solution as a crystalline precipitate when said sulfamylurea is the particular starting material employed in this example.

*Example XI*

Equimolar amounts of a N-morpholinesulfonylurea such as that used in Example X and monoethanolamine are dissolved in a sufficient amount of water at 58° C. to afford a 20% solution of the free sulfamylurea compound. Upon evaporation of the so prepared aqueous solution under reduced pressure at 40° C., there is obtained a solid residual material which is the monoethanolammonium salt of the desired compound.

In like manner, each of the other N-morpholinesulfonylureas of this invention individually form salts with diethanolamine, triethanolamine, ethylene diamine, diethylamine, triethylamine and pyridine by contacting one of the aforesaid sulfamylureas with the appropriate lower alkanolamine or lower alkylamine as the case may be in accordance with this very same reaction procedure.

*Example XII*

A dry solid pharmaceutical composition is prepared by blending the following materials together in the proportions by weight specified below:

1 - (N - morpholinesulfonyl) - 3 - (bicyclo[2.2.1]hept-5 - en - 2 - ylmethyl)urea _____ 50
Sodium citrate _____ 25
Alginic acid _____ 10
Polyvinylpyrrolidone _____ 10
Magnesium stearate _____ 5

After the dried composition is thoroughly blended, tablets are punched from the resulting mixture, each tablet being of such size that it contains 100 mg. of the active ingredient.

*Example XIII*

A dry solid pharmaceutical composition is prepared by combining the following materials in the proportions by weight specified below:

1 - [N - (2 - methylmorpholinesulfonyl)] - 3 - (bicyclo[2.2.1]hept - 5 - en - 2 - ylmethyl)urea _____ 50
Calcium carbonate _____ 20
Polyethylene glycol (average molecular weight, 4000) _____ 30

The dried solid mixture so prepared is then thoroughly agitated so as to obtain a powdered product that is completely uniform in every respect. Soft elastic and hard-filled gelatin capsules containing this pharmaceutical composition are then subsequently prepared, employing a sufficient quantity of material in each case so as to provide each capsule with 250 mg. of the active ingredient.

*Example XIV*

A dilute aqueous-levulose solution of the calcium salt of 1 - [N - (2,6 - dimethylmorpholinesulfonyl)] - 3 - (bicyclo[2.2.1]hept-5-en-2-ylmethyl)urea is prepared by dissolving said salt in a 50% aqueous levulose solution in such amount that each ml. of solution contains 75 mg. of the sulfamylurea calculated on the basis of its free sulfamylurea form. The so obtained solution can then be sweetened and/or flavored as desired in order to mask the taste of the essential active ingredient therein, and rendered more viscous by the addition of the appropriate amount of methyl cellulose.

What is claimed is:

1. A compound selected from the group consisting of sulfamylureas of the formula:

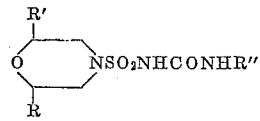

wherein each of R and R' are members selected from the group consisting of hydrogen and lower alkyl, and R" is a member selected from the group consisting of bicyclo[2.2.1]hept-5-en-2-ylmethyl and bicyclo[2.2.1]hept-2-ylmethyl; and the alkali metal, alkaline-earth metal, ammonium and water-soluble amine addition salts of said sulfamylureas.

2. 1 - (N-morpholinesulfonyl) - 3 - (bicyclo[2.2.1]hept-5-en-2-ylmethyl)urea.

3. 1 - [N - (2,6 - dimethylmorpholinesulfonyl)] - 3 - (bicyclo[2.2.1]hept-5-en-2-ylmethyl)urea.

4. 1 - [N - (2 - ethylmorpholinesulfonyl)] - 3 - (bicyclo[2.2.1]hept-2-ylmethyl)urea.

5. 1 - [N - (2,6 - di - n - propylmorpholinesulfonyl)]-3-(bicyclo[2.2.1]hept-2-ylmethyl)urea.

6. 1 - [N - (2 - methylmorpholinesulfonyl)] - 3 - (bicyclo[2.2.1]hept-5-en-2-ylmethyl)urea.

No references cited.